United States Patent [19]

Callon

[11] Patent Number: 5,600,794

[45] Date of Patent: Feb. 4, 1997

[54] METHOD AND APPARATUS FOR MANAGING EXCHANGE OF METRICS IN A COMPUTER NETWORK BY EXCHANGING ONLY METRICS USED BY A NODE IN THE NETWORK

[75] Inventor: Ross Callon, Bedford, Mass.

[73] Assignee: Bay Networks, Inc., Santa Clara, Calif.

[21] Appl. No.: 511,393

[22] Filed: Aug. 4, 1995

[51] Int. Cl.⁶ .................................................. H01J 13/00
[52] U.S. Cl. ................ 395/200.01; 370/351; 364/284.3; 364/DIG. 1
[58] Field of Search ........................... 395/200.01, 200.1, 395/200.11, 200.15; 370/54, 94.1; 364/284.3, DIG. 1

[56] References Cited

U.S. PATENT DOCUMENTS

| | | | |
|---|---|---|---|
| 4,905,233 | 2/1990 | Cain et al. | 370/94.1 |
| 5,412,654 | 5/1995 | Perkins | 370/94.1 |
| 5,535,195 | 7/1996 | Lee | 370/54 |

Primary Examiner—Alyssa H. Bowler
Assistant Examiner—John Harrity
Attorney, Agent, or Firm—Blakely, Sokoloff, Taylor & Zafman

[57] ABSTRACT

A method for minimizing advertising of metrics in a network. The described invention minimizes advertising of metrics by providing for each node to identify to the other nodes the metrics it will utilize in path selection. Each node then advertises only those metrics which are utilized by at least one other node in the network.

20 Claims, 7 Drawing Sheets

METHOD AND APPARATUS FOR MANAGING EXCHANGE OF METRICS IN A COMPUTER NETWORK BY EXCHANGING ONLY METRICS USED BY A NODE IN THE NETWORK

BACKGROUND OF THE INVENTION

1. Field of the Invention

The present invention relates to the field of networking, specifically to the field of routing messages in the network. More specifically, the present invention relates to methods and apparatus providing for management of exchange of metrics between routing nodes in the network.

2. Description of the Related Art

Communications networks allow multiple user nodes (also known as hosts or end systems, i.e., computers, file servers, etc.) to communicate often via one or more intermediate node (e.g., a router or a switch). In general, the user nodes may be interconnected via a relatively complex topology of intermediate nodes. It is therefore necessary to make use of a routing protocol in order to compute paths through the network from a source user node to a destination user node via one or more intermediate nodes.

Advertising and utilization of metrics

Routing protocols frequently need to select one path to a given destination out of a set of multiple possible paths. Typically, this is done based on a set of characteristic elements which make up the path. Such characteristics are known as metrics.

Certain routing protocols, such as the well-known Routing Information Protocol (RIP) select a path based on one characteristic (e.g., hop count), while others allow use of multiple characteristics, e.g., OSPF (see, J. Moy, Network Working Group, RFC 1247, July, 1991).

Recently, advances in networking have increased the need for more advanced path selection based on additional metrics. For example, quality of service (QOS) routing may be utilized to minimize one characteristic (for example total cost), subject to multiple constraints (for example, total path delay must be less than a specified value, available bandwidth for each element in the path must be greater than a specified value, etc.) This type of calculation requires that the routing computation have available a variety of metrics describing the characteristics of nodes and links along the path. The variety of routing computations which can be utilized to implement QOS is enormous and it is difficult to predict in advance which metrics will be required for the computations in any given network.

FIG. 1 illustrates a simple example network including nodes A–G. In order to perform advanced QOS routing in this network each node A–G may advertise a complex set of metrics describing its capabilities and current loading as well as the capabilities and current loading of its links. These advertisements are flooded to all other nodes in the network. Thus, each node, in selecting a path to other nodes, may consider the characteristics and load of every other element in the network.

Unfortunately, if each node advertises all of its available metrics, even in a relatively simple network the number of metrics which must be periodically advertised may be high which in turn adds significant network overhead. For example, in the simple exemplary network of FIG. 1, if each of the 7 nodes each advertised only 3 metrics, 21 metric advertisements would need to be advertised on the network.

Of course, in present day QOS networks, the number of metrics available for advertisement may be considerably larger than 3 and the number of nodes in a typical network may be considerably increased over the simple example of FIG. 1.

Importantly even while the number of metrics which may be available for advertisement is large, it is not predictable in advance which metrics will be required by the various nodes in the network.

As will be discussed in greater detail below, the present invention recognizes both of these issues—i.e., the relatively large amount of network traffic which is generated by all nodes advertises all of their available metrics and the unpredictability of the which metrics will be required—and the present invention implements a solution which allows for advertising of only those metrics which are required, thereby significantly reducing network overhead and required storage space on the various nodes for metrics.

Hierarchical Routing

FIG. 1 illustrates a simple, flat network architecture. Many existing network architectures allow for hierarchical routing. A hierarchical network is illustrated with reference to FIG. 2. In the network of FIG. 2, each node in group Y exchanges complete information (including a set of metrics) with all other nodes in group Y. From outside of group Y however, the entire group is summarized as a single node (illustrated graphically as node "Y" at the top of the figure). In order to implement quality of service routing, the summary nodes (such as nodes X, Y and Z) must advertise a complex set of metrics describing the capabilities and current load on the summary node. The number of metrics which are available for advertisement is equal to the total number of different metrics advertised by each individual node in group Y. Thus, the number of available metrics can be quite large.

Link State advertisements

It is worthwhile to briefly mention the use of link state advertisement in routing protocols. Link state advertisements are advertised by each node in the network over each of their active links in order to provide other nodes in the network with information indicating that an active node exists. FIG. 3 is a high level illustration of a simple flat network showing advertisement of link state on the various links. The link state advertisements are advertised periodically by each node in the network, and each link state advertisement is flooded to each node in the network.

To summarize, as stated above, the amount of metric information which may be required to be advertised in a network is potentially quite large and, as a result, the overhead associated with advertising and storing of the metric information is potentially correspondingly large. Therefore, it is desired to develop methods for minimizing network overhead when sharing metric information in a network.

SUMMARY OF THE INVENTION

A method is described for minimizing network overhead resulting from advertising of metrics. The method of the present invention is especially useful as the number of metrics utilized by routers in a network increases such that metric advertisement messages provide a considerable load on the network and storage of the resulting large number of metrics at each node becomes burdensome. The method of the present invention may in one manner generally be characterized by utilization of the following steps:

a) a first node determines which of a plurality of metrics the node will utilize in selection of paths for transmission of information over said network. Of course, the particular metrics may change over time and therefore this step is periodically repeated by the node; and b) the first node transmits over said network utilization information identifying the metrics it identified in step a.

As a result of utilization of these two steps, a second node in the network can minimize network congestion by examining said identifying information and advertising metric information only for those metrics which are utilized by other nodes in said network.

The network identifying information may be advertised in the form of a bit map with each bit corresponding to a predetermined metric. The metrics used by other nodes in a network may then be summarized by ORing the received bit maps. The bit maps may be advantageously advertised as an extension to link status advertisements in a network utilizing a routing protocol which transmits link status advertisements.

These and other aspects of the present invention will become more apparent to those skilled in the art with reference to the Detailed Description and the accompanying drawings.

Figure 1:
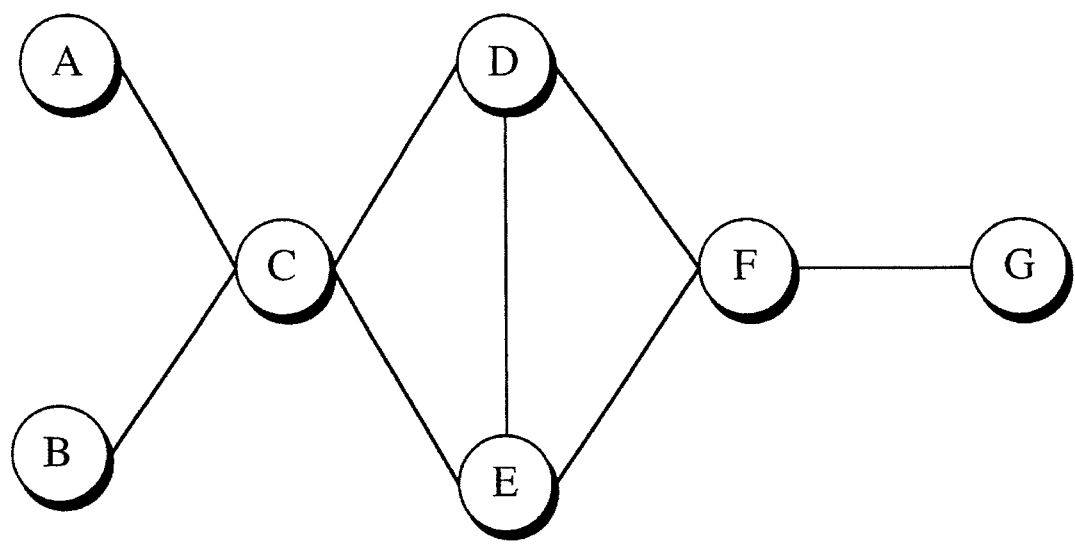
FIG. 1 illustrates an example of a flat network as may implement the present invention.
Figure 3:
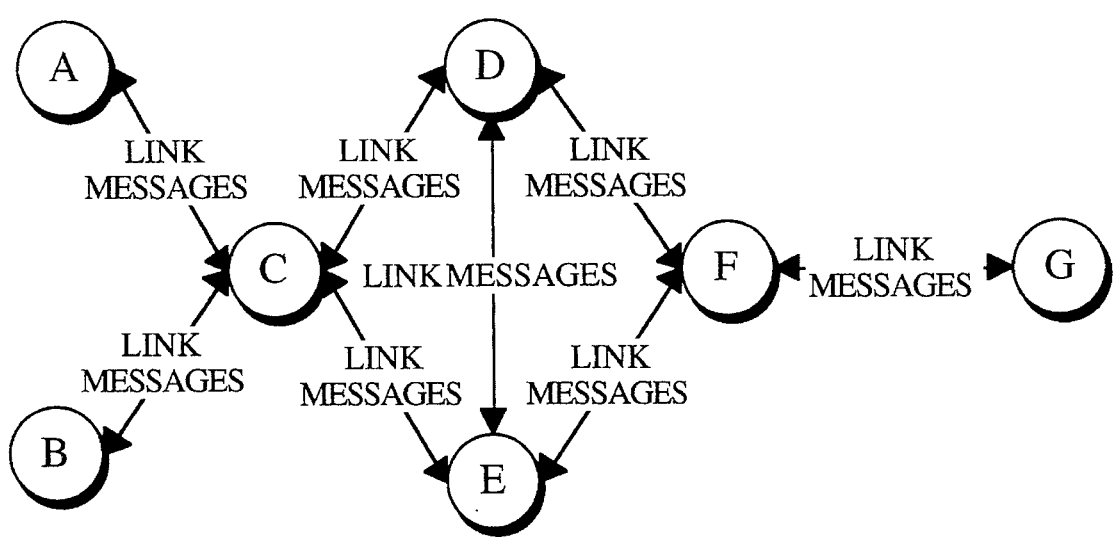
FIG. 3 illustrates the network of FIG. 1 including illustration of advertising of link state information.

For ease of reference, it might be pointed out that reference numerals in all of the accompanying drawings typically are in the form "drawing number" followed by two digits, xx; for example, reference numerals on FIG. 1 may be numbered 1xx; on FIG. 3, reference numerals may be numbered 3xx. In certain cases, a reference numeral may be introduced on one drawing and the same reference numeral may be utilized on other drawings to refer to the same item.

DETAILED DESCRIPTION

What is described herein is a method for reducing network overhead in a network requiring sharing of metric information between nodes of the network. In the following description, numerous specific details are set forth in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

Overview of a Network as May Utilize the Present Invention

Figure 2:
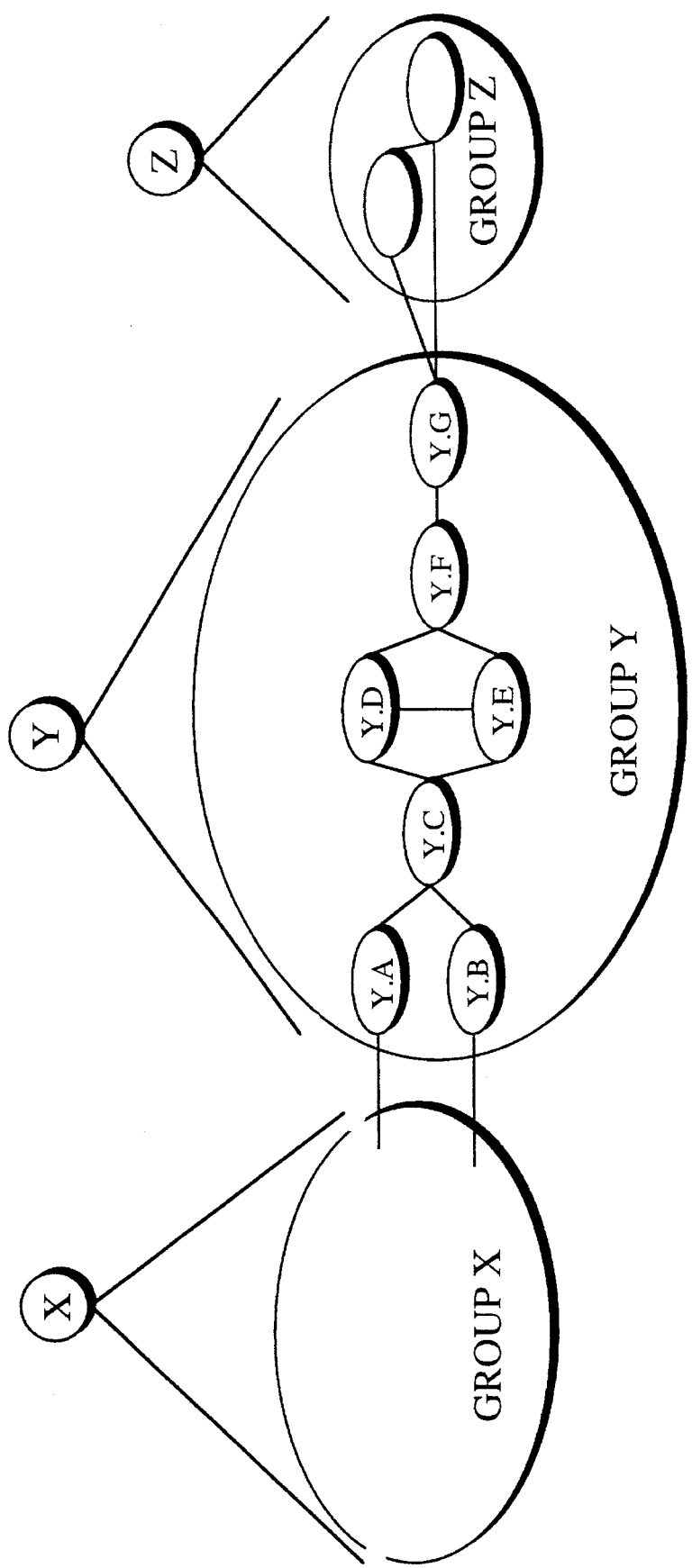
FIG. 2 illustrates an example of a hierarchical network as may implement the present invention.

FIGS. 1, 2 and 3 were discussed in some detail above in the discussion of the related art. The present invention may be implemented in a prior art network such as those illustrated by FIGS. 1, 2 and 3. The network of any of FIGS. 1, 2 or 3 may be a data network, a voice network or a combined data/voice network without departure from the spirit and scope of the present invention. In fact, the present invention may be utilized in any network designed to route transmission of information from a source node to a destination node over selectable paths where it is required to have knowledge of characteristics of the paths to make a decision on the appropriate path.

As was discussed above, in order to facilitate the path selection process, there is a need to make available an ever increasing number of metrics in a network. Which metrics may be utilized by any particular node in its path selection process is not predictable at the time the network is configured and, in fact, may change over time during normal network operations. For example, the metrics which may be used at any given point in time by any particular node, may be a function of among other factors, network size, the capabilities of the links and nodes in the networks, and the software being used at any particular node.

Thus, one known approach to advertising of metrics is simply to advertise all available metrics. However, this approach has a serious drawback in that the number of metric advertisements may be quite large as a result. This, of course, adds significant network overhead.

The present invention recognizes these issues and provides methods for minimizing the number of metrics advertised while still allowing the various nodes in the network to have access to the metrics they require for path computation.

Figure 4:
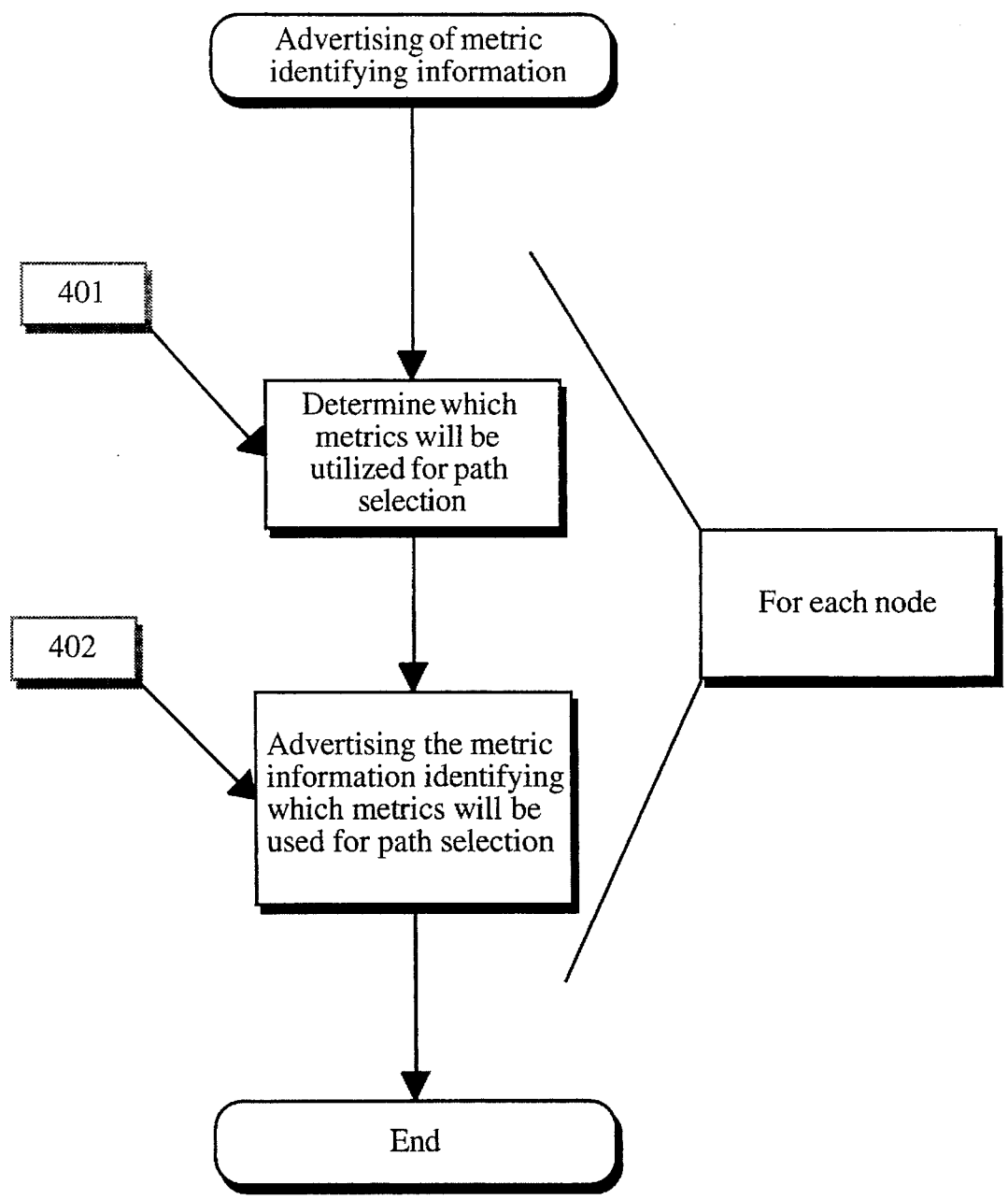
FIG. 4 is a flow diagram illustrates a method of the present invention for advertising of metric utilization information over the network.

Turning to FIG. 4, each node in the determines which metrics it requires for path selection, block 401. It then advertises metric information identifying which metric it requires for path selection. Of course, as stated above, the required metrics may change over time and, therefore, the metric utilization information is readvertised periodically.

Figure 5:
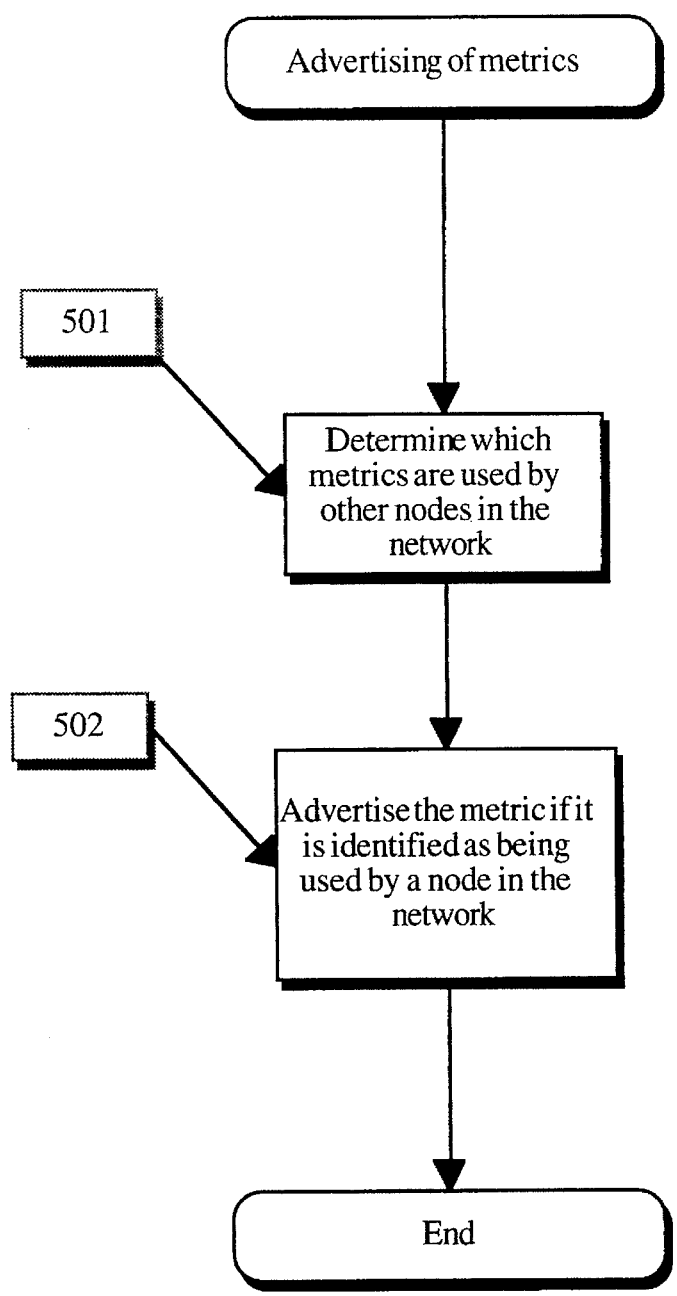
FIG. 5 is a flow diagram illustrating a method of the present invention for advertising of metrics over the network.

As illustrated by FIG. 5, prior to advertisement of metrics, each node then determines based on the information advertised in accordance with FIG. 3, which metrics are used by other nodes in the network, block 501. The node then advertises metrics identified as being used by at least one other node in the network.

Having briefly described the basic methods of the present invention, it is worthwhile to now turn to discussion of several other issues.

Compatibility with Existing Routing Protocols

The method discussed in connection with FIGS. 4 and 5 provides for a significant reduction in the number of metrics advertisements in a network. Unfortunately, however, it is likely that not all nodes in a particular network will operate in accordance with the method of FIG. 4, i.e., some nodes may not transmit information identifying which metrics they will be using. It is, however, desirable to retain compatibility with such nodes.

As one aspect of the present invention, it is proposed that if there is one or more nodes which fail to advertise the metrics they require, then the other nodes must essentially assume that the "non-reporting" node utilizes all available metrics and all metrics must be advertised.

Figure 6:
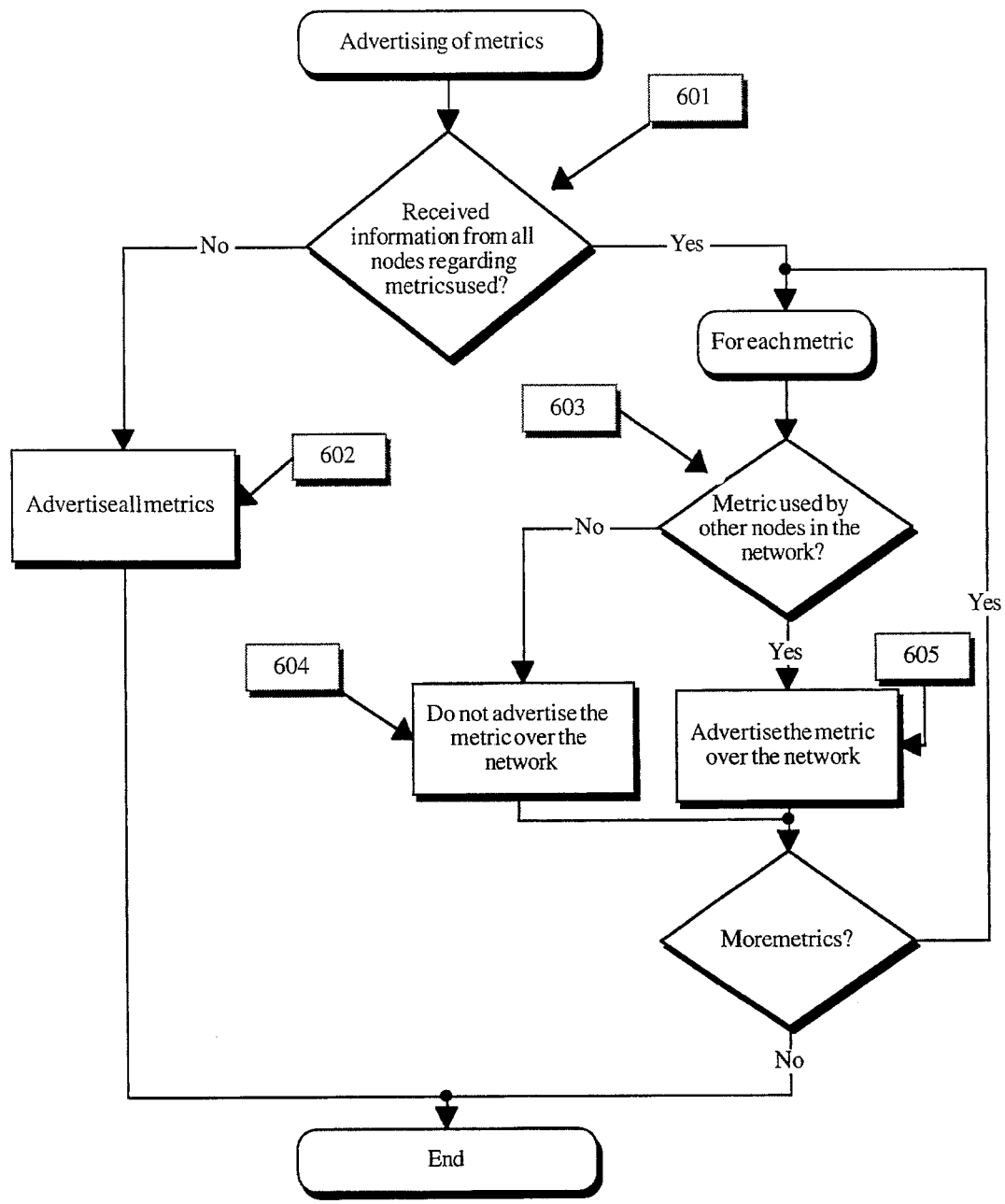
FIG. 6 is a flow diagram illustrating additional detail of a method of the present invention for advertising of metrics over the network.

FIG. 6 provides additional illustration of this aspect of the present invention. Initially, when advertising metrics, each node will determine if metric utilization information has been received from all nodes in the network, block 601. If not, all metrics are advertised on the network, block 602. Otherwise, for each metric available from the node, a determination is made whether the metrics is used by other nodes in the network, block 603. If not, the metric is not advertised on the network, block 604, and overall network traffic is reduced. If so, the metric is advertised on the network, block 605 and is therefore made available to the other nodes which require it.

Alternative Method for Achieving Compatibility with Existing Routing Protocols

As one alternative to the method of FIG. 6, it is recognized that certain protocols may provide a set default required metrics. The set of default required metrics may be defined, for example, to be a minimal set of metrics. Routers which implement more advanced routing protocols may require additional metrics beyond the minimal set and may, in fact, use only a subset of the default required metrics or even none of the default required metrics at all.

Figure 7:
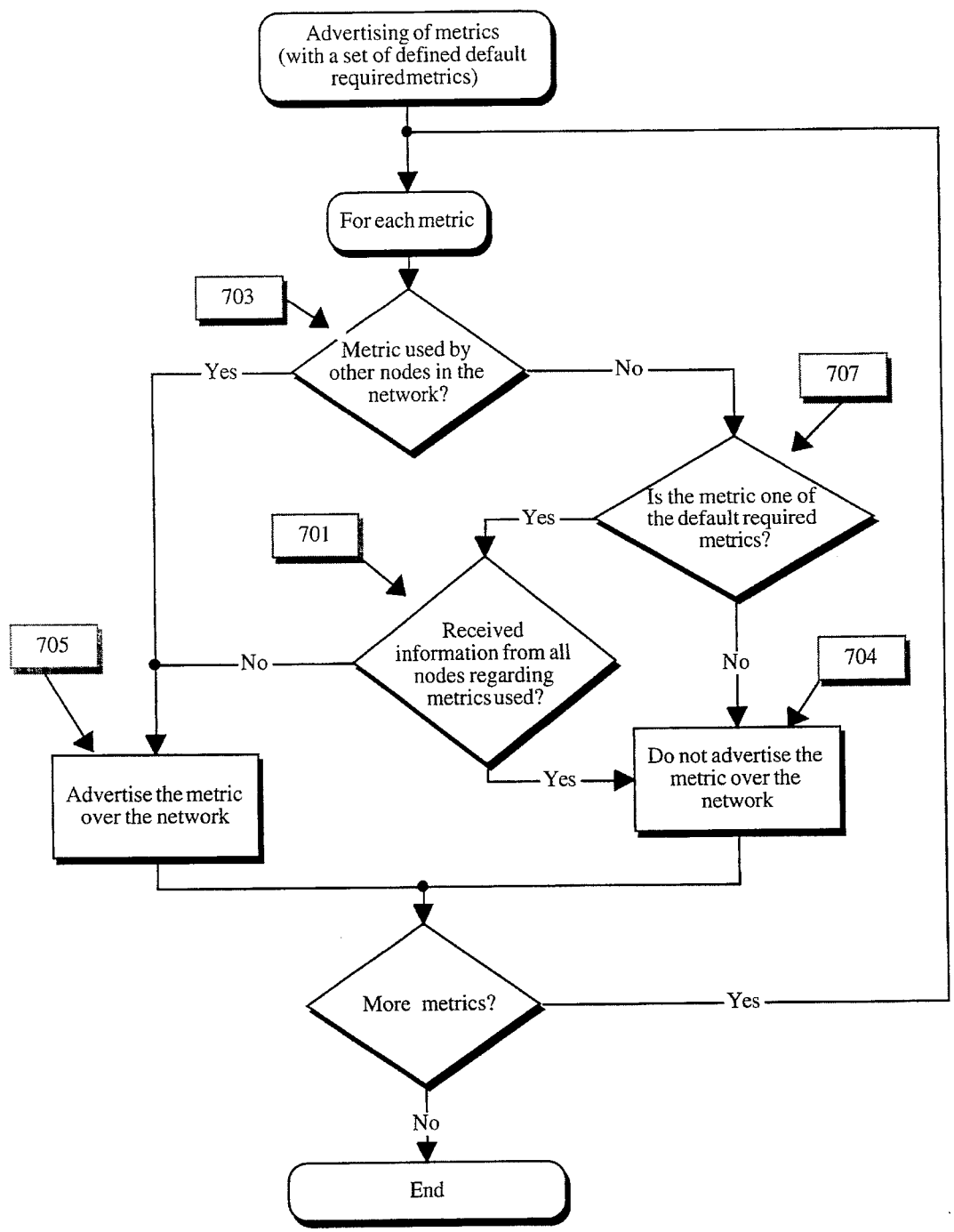
FIG. 7 is a flow diagram illustrating an alternative method of the present information for advertising of metrics over the network.

Having defined a set of default required metrics, this alternative embodiment may be described with reference to FIG. 7. In FIG. 7, the described process is carried out for each metric which a router maintains in order to determine which metrics will be advertised. For each metric, first a determination is made whether the metric is one which another node in the network has advertised that it uses, block 703. If so, the metric is advertised on the network, block 705, and it is not necessary to do any other checks before moving onto the next metric. If the metric was not advertised as being used by another node in the network, a determination is made if the metric is one of the default required metrics, block 707. If it is not, then the metric is not advertised over the network, block 704. If it is one of the default required metrics, then a determination is made whether metric utilization information was received from all nodes on the network, block 701. If so, again the metric is not advertised on the network, block 704. Otherwise, if metric utilization information was not received from all nodes, then the metric is advertised, block 705. An effect of this method is that a default required set of metrics may be defined and compatibility with existing routers may be achieved by including metrics used by existing routers in the default required set. However, if additional metrics are added to the protocol to allow for increased functionality of the system in the future, all metrics would not have to be advertised just because one node on the network did not advertise its metric utilization list.

Use of Link State Advertisements for Advertising of Metric Utilization Information Referring again to FIG. 4, the present invention operates by advertising information identifying which metrics will be used for path selection, block 402. This step may be carried out in any of a number of ways without departure from the spirit and scope of the present invention. For example, messages may be formed and advertised on the network for the purpose of advertising this information.

However, as another aspect of the present invention, it is recognized that link state messages are advertised in many networks and many existing link state protocols provide for extensibility features which allow additional information to be included in the link state advertisements. Therefore, the present invention in one embodiment proposes advertising of the metric utilization information in the link state messages. This provides for periodic retransmission of the information but yet does not add the network overhead of additional advertisement messages.

The metric utilization information may be simply advertised as a bit map. Assuming a simple example in which eight metrics have been identified for advertising on the network, each of the eight may be assigned a bit position in a bit stream. Then, for example, if node A of FIG. 1 utilizes metric 0, metric 1 and metric 7, it will advertise in the link state advertisement a bit map as follows:

1100 0001.

Similarly, node B may utilize metric 2 and 7 and would advertise a bit map as follows:

0100 0001.

Thus, utilizing this embodiment of the present invention, network overhead resulting from step 402 is minimized. Of course, while the exemplary bit maps are shown with a 1 indicating use of the metric and a 0 indicating no use of the metric, this could be reversed without departure from the spirit and scope of the present invention.

Calculation of Metrics Used by Other Nodes in the Network

Assume, for FIG. 1, the following bit maps are advertised:

| Node A | 1100 0001 |
| Node B | 0100 0001 |
| Node C | 0101 0010 |
| Node D | 0000 0001 |
| Node E | 1101 0011 |
| Node F | 1101 0010 |
| Node G | 1101 0000 |

Node A, for example, would receive the advertisements from each of nodes B–G. It could then, in accordance with FIG. 5, determine which metrics are used by the other nodes B–G in the network by scanning the bit masks for each of the other nodes and if any of the bits is set to 1, advertising the metric associated with that bit.

Alternatively, the present invention proposes that a summary bit map can be generated by ORing the bit masks for each of the other nodes B–G which would result in the following bit mask:

1101 0011

Thus, node A would be able simply examine the summary bit map to determine which metrics to advertise and in the example would advertise metrics 0, 1, 3, 6 and 7. The summary bit mask may be recomputed each time a new link advertisement message is received.

If a link advertisement message is received which does not provide for use of the present invention, the node may simply store a bit mask of all "1s", i.e., 1111 1111, for that node. The summary bit mask would then, of course, be set to all ones and all metrics would be advertised by the node.

Use of the Present Invention in Hierarchical Networks

The above discussion has primarily focused on the flat network of FIG. 1. The present invention is, however, equally applicable to hierarchical networks such as the network illustrated by FIG. 2.

In a hierarchical network, within a given group, e.g., group Y, operation of the invention is as has been just described. However, the node or nodes which are responsible for summarizing the group and communicating with other groups, e.g., nodes Y.A, Y.B and Y.G, summarize the bit maps similar to as described above and advertise the summarized bit maps to the other groups. However, in addition to ORing the bit maps from all of the other nodes in the group, the summarizing node must also include in the logical OR operation its own bit map.

Likewise, when the summarizing node determines the metrics which will be utilized for path selection, it must include all metrics which have been advertised by other groups. For example, assume that group Z advertised the following bit map:

0010 0000

Then, assuming nodes Y.A–Y.G correspond to node A-B of FIG. 1 and utilizing the exemplary bits given above, node Y.G., would advertise the following bit map within group Y:

| | |
|---|---|
| 1101 0000 | (the metrics node Y.G itself uses, see above) |
| 0010 0000 | (the bit map from group Z) |
| | OR |
| 1111 0000 | | and, node Y.G. would advertise the following bit map to group Z:

| | |
|---|---|
| Node A | 1100 0001 |
| Node B | 0100 0001 |
| Node C | 0101 0010 |
| Node D | 0000 0001 |
| Node E | 1101 0011 |
| Node F | 1101 0010 |
| Node G | 1101 0000 |
| | OR |
| | 1101 0011 |

Alternatives to the Preferred Embodiment of the Present Invention

There are, of course, alternatives to the described embodiment which are within the reach of one of ordinary skill in the relevant art. The present invention is intended to be limited only by the claims presented below.

Thus, what has been disclosed is a method for minimizing advertising of metrics in a network.

What is claimed is:

1. A method for minimizing network overhead in a network comprising the steps of:

a) a first node determining which of a plurality of metrics said node will utilize in selection of paths for transmission of information over said network; and b) said first node transmitting over said network identifying information identifying which of said metrics said node will utilize in selection of paths;

whereby a second node in said network minimizes network congestion by examining said identifying information and transmitting metric information only for those metrics which are utilized by other nodes in said network.

2. The method of claim 1 wherein said identifying information is advertised over said network as plurality of bits, each of said plurality of bits corresponding to one of said plurality of metrics.

3. The method of claim 2 wherein said plurality of bits are advertised in link state messages advertised by said first node.

4. The method of claim 2 further comprising the step of summarizing identifying information by ORing bit maps received from each node of the network.

5. The method of claim 4 further comprising the step of storing a bit map of all 1s for any node for which a metric information advertisement is not received.

6. The method of claim 1 wherein said identifying information is advertised in link state messages advertised by said first node.

7. The method of claim 1 wherein said network is a hierarchical network and one node in a first node group summarizes metric utilization information from other nodes in said first node group for advertising to other node groups.

8. A method for minimizing network overhead in a network comprising the steps of:

a) a first node receiving from other nodes in said network utilization information identifying which of a plurality of metrics said other nodes require for selection of paths for transmission of information in said network; and b) said first node transmitting over said network information only for those metrics which are utilized by other nodes in said network.

9. The method of claim 8 wherein said utilization information is received over said network as plurality of bits, each of said plurality of bits corresponding to one of said plurality of metrics.

10. The method of claim 9 wherein said plurality of bits are received in link state messages by said first node.

11. The method of claim 8 wherein said utilization information is received in link state messages advertised by said first node.

12. The method of claim 8 further comprising the step of summarizing identifying information by ORing bit maps received from each node of the network.

13. The method of claim 12 further comprising the step of storing a bit map of all 1s for any node for which a metric information advertisement is not received.

14. The method of claim 13 wherein said network is a hierarchical network and one node in a first node group summarizes metric utilization information from other nodes in said first node group for advertising to other node groups.

15. A method for advertising by a first node of a metric in a network, said method comprising the steps of:

(a) determining if the metric has been identified as being used by other nodes in said network and, if so, advertising said metric on said network;

(b) determining is said metric is one of a default set of required metrics and, if so, determining if all nodes on said network have advertised metric utilization information and, if not, advertising said metric on said network.

16. The method as recited by claim 15 further comprising the steps of:

(c) if said metric is not one of said default set of required metrics, not advertising said metric on said network; and (d) if said metric is one of said default set of required metrics, and metric utilization information has been received from all nodes on said network, not advertising said metric on said network.

17. The method of claim 15 wherein said network is a hierarchical network and one node in a first node group summarizes metric utilization information from other nodes in said first node group for advertising to other node groups.

18. The method of claim 15 wherein said step of determine if said metric has been identified as being used by other nodes in said network is accomplished by examining metric utilization information received from said other nodes.

19. The method of claim 18 wherein said metric utilization information is received as a bit map and each bit of said bit map corresponds to a metric.

20. The method of claim 19 further comprising the step of summarizing identifying information by ORing bit maps received from each node of the network.

\* \* \* \* \*